(12) United States Patent
Lee et al.

(10) Patent No.: US 10,230,139 B2
(45) Date of Patent: Mar. 12, 2019

(54) TEMPERATURE CONTROL APPARATUS AND METHOD FOR ENERGY STORAGE SYSTEM

(71) Applicant: LG Chem, Ltd., Seoul (KR)

(72) Inventors: Hyun-Min Lee, Daejeon (KR); Ji-Hun Kim, Daejeon (KR); Young-Chang Jo, Daejeon (KR); Suk-Chul Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/494,766

(22) Filed: Apr. 24, 2017

(65) Prior Publication Data
US 2017/0324127 A1 Nov. 9, 2017

(30) Foreign Application Priority Data
May 3, 2016 (KR) .................. 10-2016-0054863

(51) Int. Cl.
*H01M 10/633* (2014.01)
*H01M 10/48* (2006.01)
(Continued)

(52) U.S. Cl.
CPC ....... *H01M 10/633* (2015.04); *H01M 10/486* (2013.01); *H01M 10/6563* (2015.04); *H01M 10/663* (2015.04); *H01M 10/613* (2015.04)

(58) Field of Classification Search
CPC ......... H01M 8/04303; H01M 8/04111; H01M 8/04753; H01M 2008/1095; H01M 10/60;
(Continued)

(56) References Cited

U.S. PATENT DOCUMENTS 9,246,201 B2 1/2016 Takanezawa et al.
2009/0249803 A1 10/2009 Suzuki et al.
(Continued)

FOREIGN PATENT DOCUMENTS

JP 2001313092 A 11/2001
JP 2012190688 A 10/2012
(Continued)

OTHER PUBLICATIONS

European Search Report for Application No. EP17168911 dated Oct. 5, 2017.

*Primary Examiner* — Anthony R. Jimenez
(74) *Attorney, Agent, or Firm* — Lerner, David, Littenberg, Krumholz & Mentlik, LLP

(57) ABSTRACT

A temperature control apparatus for an energy storage system, which includes a battery module, a temperature sensor and an HVAC system, includes a first communication unit configured to receive first temperature information indicating a temperature of the battery module from a battery management system combined with the battery module; a second communication unit configured to receive from the temperature sensor second temperature information indicating a temperature measured by the temperature sensor; and a control unit connected with the first communication unit and the second communication unit. The control unit controls the HVAC system based on the first temperature information while the first temperature information is being received normally, estimates the first temperature information based on the second temperature information while the first temperature information is not being received normally and the second temperature information is being received normally, and controls the HVAC system based on the estimated first temperature information.

15 Claims, 11 Drawing Sheets

(51) Int. Cl.
*H01M 10/663* (2014.01)
*H01M 10/6563* (2014.01)
*H01M 10/613* (2014.01)

(58) Field of Classification Search
CPC ...... H01M 10/61; H01M 10/63; H01M 10/65; H01M 10/651; H01M 10/633; H01M 10/6563; H01M 10/663; H01M 10/486; H01M 10/613; H01M 8/04225; H01M 8/0432; H01M 8/04701
USPC .......................................................... 429/446
See application file for complete search history.

(56) References Cited

U.S. PATENT DOCUMENTS

2012/0256569 A1 10/2012 Kawahara et al.
2016/0091374 A1 3/2016 Kim et al.

FOREIGN PATENT DOCUMENTS

| KR | 20160022028 A | 2/2016 |
| KR | 20160036423 A | 4/2016 |
| KR | 20160043852 A | 4/2016 |

| OPERATION MODE | EMISSION TEMPERATURE | EMISSION FLOW RATE | EMISSION SPEED |
|---|---|---|---|
| Mode #1 | H | H | H |
| Mode #2 | L | H | H |
| Mode #3 | H | L | L |
| Mode #4 | L | H | L |
| Mode #5 | L | L | H |

TEMPERATURE CONTROL APPARATUS AND METHOD FOR ENERGY STORAGE SYSTEM

CROSS REFERENCE TO RELATED APPLICATIONS

The present application claims priority from Korean Patent Application No. 10-2016-0054863 filed on May 3, 2016, the disclosure of which is hereby incorporated herein by reference.

TECHNICAL FIELD

The present disclosure relates to a temperature control apparatus and method, and more particularly, to a temperature control apparatus and method for an energy storage system.

BACKGROUND ART

Recently, as demands for portable electronic products such as notebooks, video cameras, portable telephones and the like increase significantly, and development of medium or large size apparatuses such as electric vehicles, energy storage batteries, robots, satellites and the like is kicked into high gear, research on high performance secondary batteries that can be charged and discharged repeatedly is proceeding actively.

Currently, commercially available secondary batteries comprise nickel cadmium batteries, nickel hydrogen batteries, nickel zinc batteries, lithium secondary batteries, etc. Among them, lithium secondary batteries have drawn much attention because of little memory effect to allow unrestrained charging and discharging, as well as very low self-discharging rate and high energy density, compared to nickel-based secondary batteries.

Such secondary batteries are gathering attention as a new energy source for increasing environmentally friendliness and energy efficiency not only because of a primary advantage that they can innovatively reduce use of fossil fuels but also because they do not generate byproducts at all due to use of energy.

An energy storage system refers to a system configured to store electricity supplied from outside, and then to supply the stored electricity to the outside in case of emergencies such as blackouts. Such an energy storage system is basically comprised of a battery module and apparatuses that efficiently manage the battery module, and it is a concept that covers not only systems that store high-capacity electricity generated from power plants and the like but also apparatuses that store relatively low-capacity electricity such as portable electronic devices.

The battery module generally consists of an assembly consisting of a plurality of unit cells and a plurality of such assemblies, the unit cell including a positive electrode current collector, a separator, an active material, an electrolyte, an aluminum thin film layer and the like, and thus having a structure that is chargeable and dischargeable by an electrochemical reaction between configurative elements.

The life expectancy, stability and operational performance of the battery module depend on electrochemical or electrophysical characteristics of the unit cells included therein, wherein the electrochemical or electrophysical characteristics may change rapidly according to the external environment.

Especially, charging and discharging processes of the battery module are significantly influenced by the temperature of the battery module itself or its surrounding temperature. For example, when exposed to unfavorable conditions such as an extremely low temperature or an extremely high temperature, that is outside an optimum temperature range, the charging and discharging efficiency of the battery module decreases, and accordingly, a problem of difficulty in securing performance regarding a normal operation may occur. Further, the longer time the battery module is exposed to such unfavorable conditions, the more rapidly the life expectancy of the battery module decreases, and also, in some cases, there is a risk of explosion.

Conventional technologies measure the temperature of the space where the battery module is installed, and adjust the flow rate, temperature and the like of the cooling medium (e.g., air) being supplied to said space based on the measured temperature, so that the battery module can operate within a predetermined optimum temperature range. However, since a difference of temperature between the space where the battery module is installed and the battery module itself is inevitable, there are limitations in controlling the temperature exactly.

There are other conventional technologies as well, that receive temperature information of the battery module itself from a battery monitoring system (BMS) that is combined with the battery module, and control the temperature of the space where the battery module is installed based on the received temperature information. However, there is a problem that, when a situation occurs where communication with the BMS is impossible, temperature control of the battery module becomes impossible.

DISCLOSURE

Technical Problem

The present disclosure is designed to solve the problems of the related art, and therefore the present disclosure is directed to providing an apparatus where a temperature sensor is installed in an inner space of an energy storage system having a battery module, so that when a situation occurs where temperature information of the battery module cannot be received, temperature information being provided from the temperature sensor is utilized to control the temperature of the inner space of the energy storage system within a suitable range, and a method thereof.

Especially, the purpose of the present disclosure is to provide an apparatus that is configured to estimate the temperature of the battery module itself based on the temperature information being provided from the temperature sensor, and to control the temperature of the inner space of the energy storage system according to the estimated temperature, and a method thereof.

The other objectives and advantages of the present disclosure can be understood with the following description and more clearly with the embodiments of the present disclosure. Also, it should be easily understood that the other objectives and advantages of the present disclosure can be implemented by the means described in the claims and the combinations thereof.

Technical Solution

Various embodiments of the present disclosure for achieving the aforementioned purposes are as follows.

A temperature control apparatus according to one aspect of the present disclosure is for an energy storage system, and the energy storage system includes a case, a battery module provided inside the case, a temperature sensor and an HVAC system. The temperature control apparatus may include a first communication unit configured to receive first temperature information indicating a temperature of the battery module from a battery management system combined with the battery module; a second communication unit configured to receive from the temperature sensor, second temperature information indicating a temperature measured by the temperature sensor; and a control unit connected with the first communication unit and the second communication unit in an operable manner. Here, the control unit may control the HVAC system based on the first temperature information while the first temperature information is being received normally, estimate the first temperature information based on the second temperature information while the first temperature information is not being received normally and the second temperature information is being received normally, and control the HVAC system based on the estimated first temperature information.

Further, the temperature control apparatus may further include a third communication unit configured to receive air conditioning information indicating an operation mode of the HVAC system. In this case, the control unit may control the HVAC system further based on the air conditioning information.

Further, the battery module may be disposed between an inlet and an outlet formed in a rack provided inside the case, the air conditioning information may include a temperature value of a cooling medium being introduced into the inlet, and the second temperature information may include a temperature value of the cooling medium being emitted from the outlet. In this case, the control unit may estimate the first temperature information based on the temperature value of the cooling medium being introduced into the inlet and the temperature value of the cooling medium being emitted from the outlet, while the first temperature information is not being received normally and the second temperature information is being received normally.

Depending on an embodiment, the battery module may be disposed between the inlet and the outlet formed in the rack provided inside the case, and the second temperature information may include the temperature value of the cooling medium being introduced into the inlet and the temperature value of the cooling medium being emitted from the outlet. In this case, the control unit may estimate the first temperature information based on the temperature value of the cooling medium being introduced into the inlet and the temperature value of the cooling medium being emitted from the outlet, while the first temperature information is not being received normally and the second temperature information is being received normally.

Further, the control unit may estimate the first temperature information using an equation below, while the first temperature information is not being received normally and the second temperature information is being received normally.

$$T_e = T_i + m \times C \times (T_o - T_i) \times \frac{1}{h \times A} \quad \text{[Equation]}$$

In the equation, $T_i$ may be the temperature value of the cooling medium being introduced into the inlet, $T_o$ may be the temperature value of the cooling medium being emitted from the outlet, m may be a predetermined flow rate value of the cooling medium, C may be a predetermined specific heat of the cooling medium, h may be a predetermined convective heat transfer coefficient, A may be a predetermined surface area of the battery module, and $T_e$ may be the estimated first temperature information.

Further, the control unit may compare the first temperature information with the second temperature information and learn a correlation between the first temperature information and the second temperature information, while the first temperature information and the second temperature information are being received normally. Here, the control unit may set a compensation value regarding each of a plurality of predetermined temperature sections, based on the correlation.

The control unit may estimate the first temperature information based on the correlation and the second temperature information, while the first temperature information is not being received normally and the second temperature information is being received normally, after the learning of the correlation is completed, and control the HVAC system based on the estimated temperature.

Further, the control unit may estimate the temperature of each battery module by applying the compensation value set to any one temperature section where the second temperature information belongs, of the plurality of temperature sections, to the second temperature information, while the first temperature information is not being received normally and the second temperature information is being received normally, after the learning of the correlation is completed. In this case, the control unit may learn the correlation per operation mode of the HVAC system.

According to another aspect of the present disclosure, there is provided an energy storage system including the aforementioned temperature control apparatus.

According to another aspect of the present disclosure, there is provided a temperature control method, the method including monitoring a receiving state of first temperature information indicating a temperature of a battery module provided inside a case of an energy storage system; monitoring the receiving state of second temperature information indicating a temperature measured by a temperature sensor provided inside the case; controlling the HVAC system provided inside the case based on the first temperature information, when first temperature information is received normally; estimating the first temperature information based on the second temperature information, when the first temperature information is not received normally and the second temperature information is received normally; and controlling the HVAC system based on the estimated first temperature information.

Further, the temperature control method may further include receiving air conditioning information indicating an operation mode of the HVAC system.

Depending on an embodiment, the battery module may be disposed between the inlet and the outlet formed in a rack provided inside the case, the air conditioning information may include a temperature value of a cooling medium being introduced into the inlet, and the second temperature information may include a temperature value of the cooling medium being emitted from the outlet. In this case, the estimating the first temperature information may estimate the first temperature information based on the temperature value of the cooling medium being introduced into the inlet and the temperature value of the cooling medium being emitted from the outlet, when the first temperature information is not received normally and the second temperature information is received normally.

Further, the temperature control method may further include comparing the first temperature information with the second temperature information while the first temperature information and the second temperature information are being received normally, and learning a correlation between the first temperature information and the second temperature information. In this case, the estimating the first temperature information may estimate the first temperature information based on the correlation and the second temperature information.

Advantageous Effects

According to an embodiment of the present disclosure, it is possible to install a temperature sensor in an inner space of an energy storage system having a battery module, so that when a situation occurs where temperature information indicating a temperature value of the battery module itself cannot be received, temperature control regarding the energy storage system may be performed based on the temperature information being provided from the temperature sensor.

Further, according to at least one of the embodiments of the present disclosure, it is possible to estimate the temperature of the battery module itself based on the temperature information being provided from the temperature sensor, and control the temperature of the inner space of the energy storage system according to the estimated temperature, thereby controlling the temperature of the inner space of the energy storage system more exactly even in a situation where the temperature of the battery module itself cannot be known directly.

Further, according to at least one of the embodiments of the present disclosure, it is possible to learn in advance the correlation between the temperature information received from a BMS of the battery module and the temperature information being provided from the temperature sensor, while the temperature information is being received normally from the BMS of the battery module. Thereafter, while the temperature information is not being received normally from the BMS of the battery module, it is possible to correct the temperature information being provided from the temperature sensor based on the correlation, and adjust the temperature of the space where the battery module is installed using the corrected temperature information.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

Figure 1A:
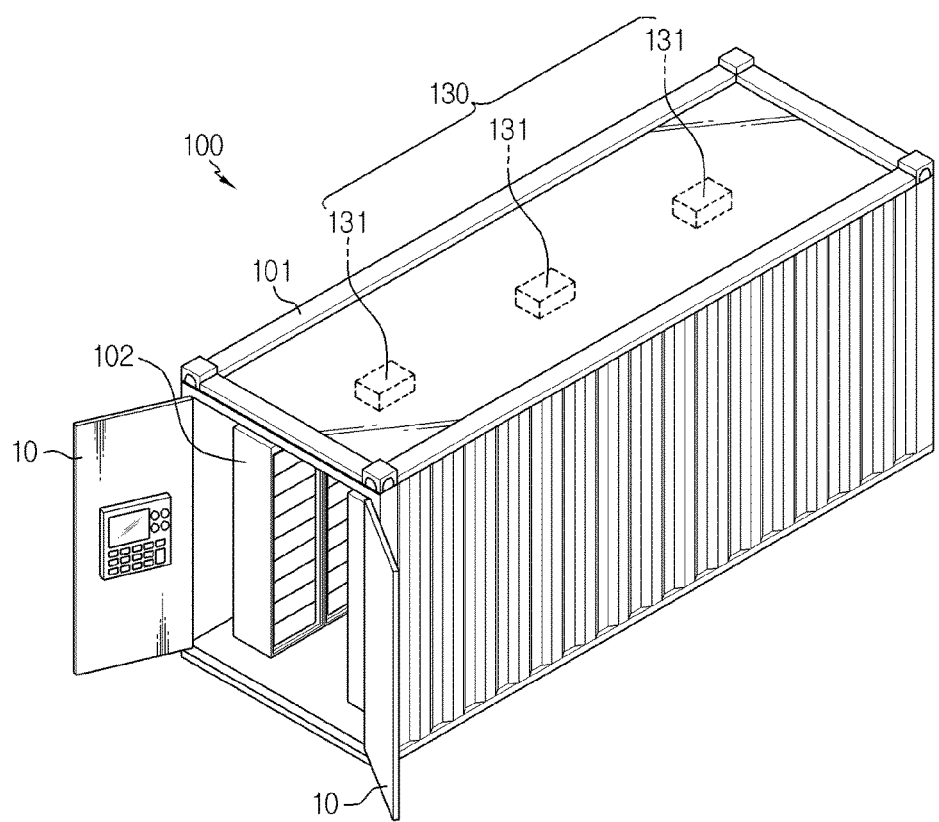
FIGS. 1A to 1C are views schematically illustrating a configuration of an energy storage system according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments disclosed in the present specification and the configurations illustrated in the drawings are merely the most preferred embodiments of the present disclosure, and not all of them represent the technical ideas of the present disclosure, and thus it should be understood that there may be various equivalents and modified examples that could substitute therefor at the time of filing the present application.

Further, in explaining the present disclosure, any specific explanation on a well-known related configuration or function deemed to obscure the gist of the present disclosure will be omitted.

Throughout the specification, unless specifically disclosed to the contrary, a portion "including" a configurative element does not mean to exclude other configurative elements, but means that the portion may further include other configurative elements as well. Further, terms such as a <control unit> disclosed in the specification means a unit for processing at least one function or operation, and this may be realized by hardware or software, or by a combination of hardware and software.

Further, throughout the specification, a portion being "connected" with another portion does not only include cases where the portion is "directly connected", but also cases where the portion is "indirectly connected" having another device inbetween.

Hereinafter, a temperature control apparatus according to an embodiment of the present disclosure will be explained.

Figure 1B:
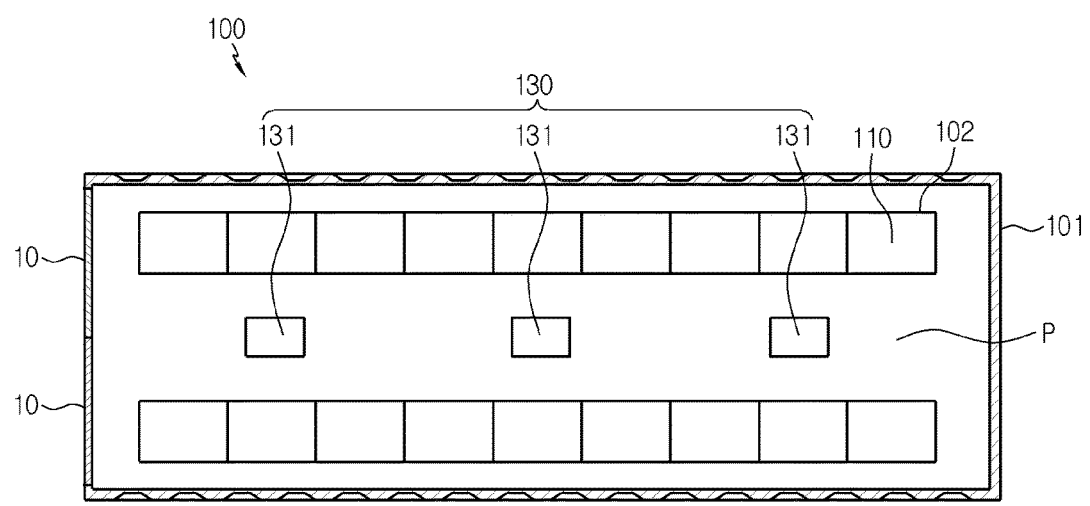
Figure 1C:
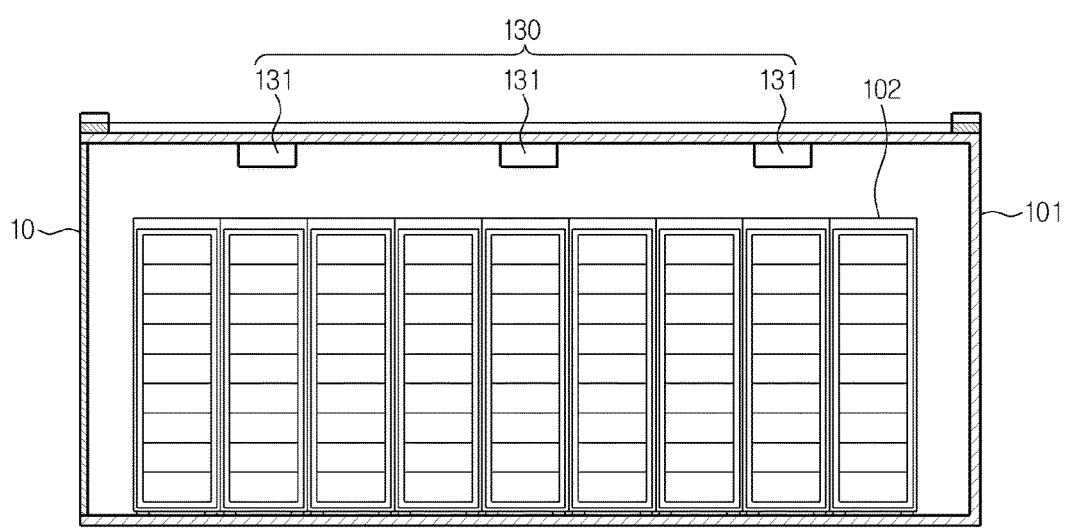

FIGS. 1A to 1C are views schematically illustrating a configuration of an energy storage system 100 according to an embodiment of the present disclosure. Specifically, FIG. 1A is a perspective view of the energy storage system 100, FIG. 1B is a plane view of the energy storage system 100 of FIG. 1A, and FIG. 1C is a side cross-sectional view of the energy storage system 100 of FIG. 1A.

First, referring to FIGS. 1A to 1C, the energy storage system (ESS) 100 may be configured to include a case 101, a battery assembly, a temperature measurement system 120, an HVAC system 130 and a temperature control apparatus 140.

The case 101 provides an inner space that may accommodate other configurations of the energy storage system 100, and serves to prevent the other configurations from being directly exposed outside. The case 101 may be called a 'container' depending on the field of use of the energy storage system 100. On at least one surface of the case 101, an openable/closeable door 10 may be provided. For example, in cases where the energy storage system 100 needs to be repaired and the like, a user may enter and exit the case 101 through the door 10.

In general, the case 101 may be manufactured in a generally rectangular parallelepiped form, each surface of the case 101 having an integral form, or a structure that is separable into at least two portions.

Such a case 101 may include therein at least one or more racks 102 where the battery module 110 composing the battery assembly may be loaded.

When there are a plurality of battery modules 110 included in the battery assembly that will be explained hereinbelow, each battery module 110 may be individually loaded according to the shape and location of the rack 102, and then mutually connected in parallel or in series through cables and the like. The number of the racks 102 may be suitably determined according to the number of the battery modules 110 included in the battery assembly.

Referring to FIG. 1B, the plurality of racks 102 may be disposed at both sides of a passage area P in a longitudinal direction of the case 101, according to a determined order.

The battery assembly is configured to include at least one or more battery modules 110. In cases where the plurality of battery modules 110 are included in the battery assembly, any one battery module 110 may be configured such that it is mutually connectable with at least one of the rest of the battery modules 110 in parallel or in series, through a connection means such as cables and the like.

Each battery module 110 may be realized in a form where a plurality of unit cells are assembled. Here, there is no particular limitation to the type of the unit cell, and thus, the unit cell may consist of secondary batteries such as lithium ion battery, lithium polymer battery, nickel cadmium battery, nickel hydrogen battery, nickel zinc battery and the like that are rechargeable. It is obvious that the number of unit cells to be included per battery module 110 may vary according to the output voltage and capacity required in the battery module 110.

Further, to the battery module 110, a BMS (reference numeral 111 of FIG. 2B) for controlling charging and discharging operations and the like of the battery module 110 may be combined. Here, the BMS 111 may be one that is included in the battery module 110, or one that is manufactured separately from the battery module 110 and then connected through a signal line and the like. The BMS 111 may be provided in every battery module 110, or one BMS 111 may be provided per group consisting of two or more battery modules 110. For example, the BMS 111 may be embedded in the battery module 110. The BMS 111 may generate first temperature information indicating the temperature of the battery module 110 itself using the temperature sensor embedded in the battery module 110. Here, it is to be noted that the temperature sensor embedded in the battery module 110 has nothing to do with the temperature sensor 121 of the temperature measurement system 120 that will be explained hereinbelow.

The BMS 111 is applied with an algorithm for measuring electrical characteristic values such as a charging and discharging current or a voltage, for controlling charging and discharging, for controlling equalization of voltage for estimating a state of charge (SOC) and the like, of the battery module 110 or the unit cells included therein, to monitor and control the state of the unit cell included in the battery module 110.

The HVAC system 130 serves to at least partially heat, cool or ventilate the inner space of the case 101 using the cooling medium. Such an HVAC system 130 includes at least one air conditioning apparatus 131.

In cases where a plurality of air conditioning apparatuses 131 are included in the HVAC system 130, any one of the air conditioning apparatuses 131 may be connected with at least one of the rest of the air conditioning apparatuses 131 in a directly/indirectly operable manner. For example, any one air conditioning apparatus 131 may mutually exchange air conditioning information with another air conditioning apparatus 131 in a certain communication method. Further, each air conditioning apparatus 131 may be installed in a generally identical interval from another adjacent air conditioning apparatus 131, according to a longitudinal direction, width direction or height direction of the case 101. For example, the air conditioning apparatus 131 may be mounted on a loop side of the case 101, as illustrated in FIGS. 1A to 1C. Preferably, the air conditioning apparatus 131 may be disposed in an area, of an entirety of area of the loop of the case 101, that faces the passage area P in an up and down direction. However, the location of the air conditioning apparatuses 131 mounted on the case 101 and the arrangement relationship between the air conditioning apparatuses 131 are not limited to the example illustrated in FIGS. 1A to 1C.

The temperature measurement system 120 performs a function of measuring the temperature inside the case 101, and transmits data indicating the measured temperature value to the control unit 145. That is, the temperature measurement system 120 is operated independently from the BMS 111 of the battery module 110, and may be configured to include at least one temperature sensor 121. Preferably, the temperature measurement system 120 includes a plurality of temperature sensors 121. For example, it is advantageous that the greater the inner space of the case 101, the greater the number of temperature sensors 121 included in the temperature measurement system 120.

Specifically, a plurality of temperature sensors 121 of the temperature measurement system 120 may be installed in the inner space of the case 101, in which case it is preferable that each temperature sensor 121 is installed in a different position from another temperature sensor 121. It is possible to dispose the plurality of temperature sensors 121 in different positions inside the case 101, thereby collecting information indicating the temperature deviation per height and the like caused by the heat convection phenomenon and the like.

For example, the plurality of temperature sensors 121 may be provided such that at least two temperature sensors 121 are provided in every rack 102 where the plurality of battery modules 110 are loaded, the temperature sensors 121 having a difference of height in the rack 102. In another example, some of the plurality of temperature sensors 121 may be installed in the rack 102, while the rest of the temperature sensors 121 are provided in an area between the case 101 and the battery assembly.

Meanwhile, each of the battery module 110 may not have a uniform temperature distribution due to various reasons such as a difference of state of charge (SOC) between a plurality of secondary batteries included therein, whether there is a charging operation or a discharging operation caused by the BMS 111, a difference of insulation resistance between electrodes, swelling phenomenon and the like. That is, between the different battery modules 110, a temperature deviation may occur due to the aforementioned reasons. For example, due to the convection current phenomenon that causes the air with a relatively higher temperature to rise, the temperature of the battery module 110 loaded at an upper end may be higher than the temperature of the battery module 110 loaded at a lower end of the same rack 102.

In order to maintain a normal and uniform operating performance of all the battery modules 110 of the energy storage system 100, it is especially important to measure or estimate the exact temperature of the battery module 110 itself.

Figure 2A:
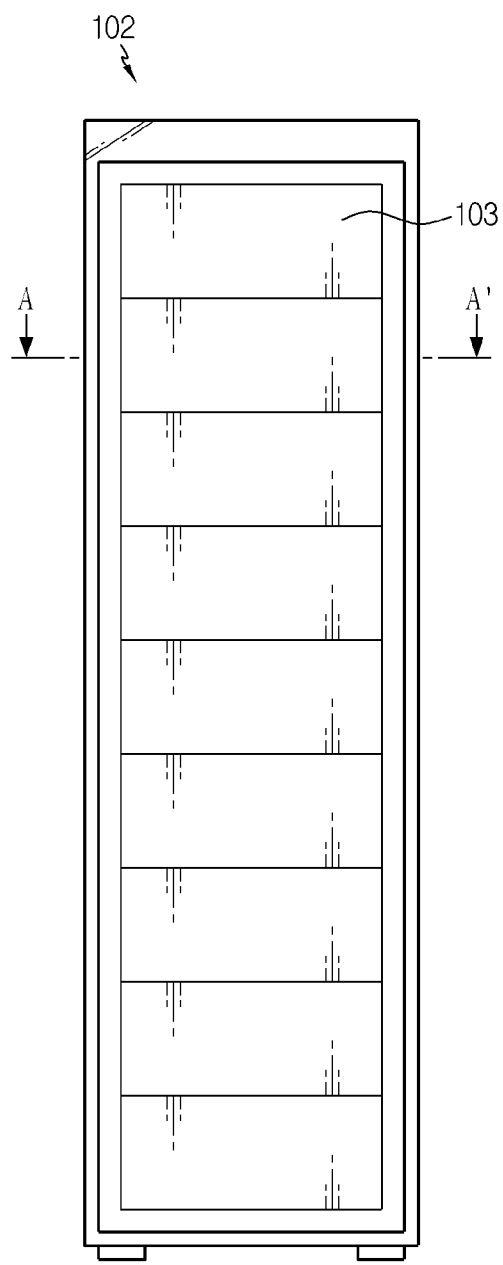
FIGS. 2A and 2B are views specifically illustrating a structure of a rack illustrated in FIG. 1.
Figure 2B:
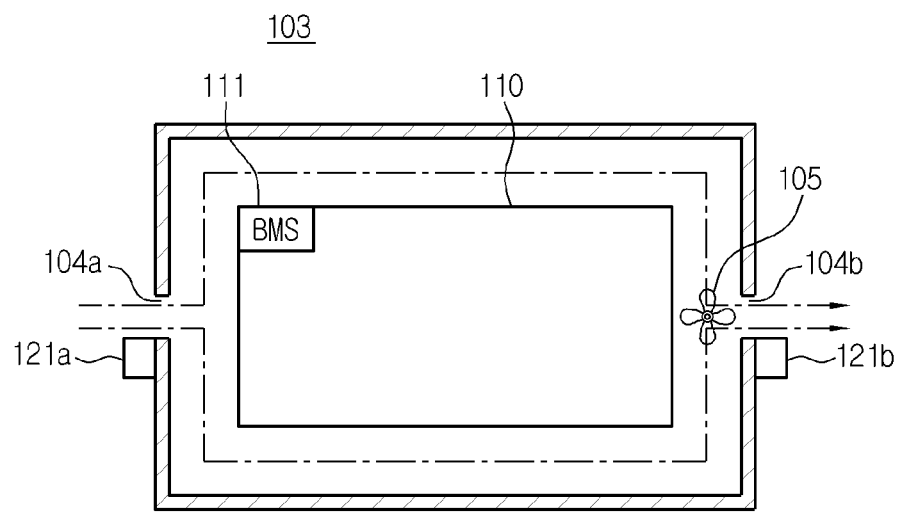

FIGS. 2A and 2B are views specifically illustrating the structure of the rack 102 illustrated in FIG. 1. Specifically, FIG. 2A is a front view of the rack 102 configured such that the plurality of battery modules 110 may be stacked in an up and down direction, and FIG. 2B is a cross-sectional view in the case where a housing unit of FIG. 2A is cut along A-A'.

Referring to FIG. 2A and FIG. 2B, the rack 102 may have a multilayer structure, where the battery module 110 may be disposed on every layer. Here, the portion where the battery module 110 is disposed may be called the 'housing unit 103'.

The housing unit 103 may basically serve to support the battery module 110 stably, and encase at least a portion of the battery module 110, thereby protecting the battery module 110 from external impact and the like. For example, as illustrated in FIG. 2B, an inlet 104a and an outlet 104b may be formed in each housing unit 103, and the rest of the area in the housing unit 103 excluding the portion where the inlet 104a and the outlet 104b are formed may be at least partially sealed. Preferably, the inlet 104a may be formed to face the passage area P of the case 101, and the outlet 104b may be formed to face the opposite side of the passage area P. Accordingly, it may be easier to have the cooling medium being supplied from the air conditioning apparatus 131 to reach the inlet 104a before the outlet 104b.

Depending on an embodiment, the temperature sensor 121 may be disposed in a predetermined position of the housing unit 103. Specifically, the temperature sensor 121 may be disposed at only the outlet 104b side of the housing unit 103. Otherwise, the temperature sensor 121 may be disposed at the inlet 104a side and the outlet 104b side. The temperature sensor 121a disposed at the inlet 104a side and the temperature sensor 121b disposed at the outlet 104b side of the same housing unit 103 may form a pair.

Further, at the outlet 104b side of the housing unit 103, a fan 105 operated by a separate power source may be provided, and the battery module 110 may be disposed in the area between the inlet 104a and the outlet 104b. As shown by the arrow in FIG. 2B, the cooling medium may be introduced into the inlet 104a by rotation of the fan provided in the housing unit 103, and then go through the battery module 110, and emitted out of the housing unit 103 through the outlet 104b. Here, the speed of the fan provided in the housing unit 103 may be uniform, and accordingly, the air flow rate by the fan may be predetermined. Of course, it is also possible to configure the fan of the housing unit 103 such that its speed can be adjusted when necessary.

Meanwhile, at least one or more temperature sensors 121 may be provided in every housing unit 103. Otherwise, the temperature sensor 121 may be provided in only some of the housing units 103 such that they have a difference of height.

Figure 3:
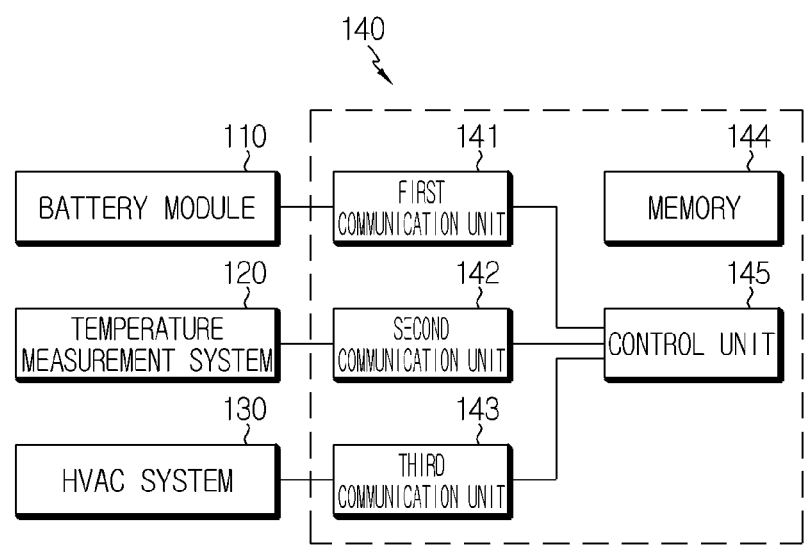
FIG. 3 is a view schematically illustrating a configuration of a temperature control apparatus according to an embodiment of the present disclosure.

FIG. 3 is a view schematically illustrating a configuration of the temperature control apparatus 140 according to an embodiment of the present disclosure.

Referring to FIG. 3, the temperature control apparatus 140 may include a first communication unit 141, a second communication unit 142, a third communication unit 143, a memory 144 and a control unit 145.

The first communication unit 141 may be connected wiredly/wirelessly with the battery assembly, to receive temperature information indicating the temperature of the battery module 110. Hereinbelow, the temperature information indicating the temperature of the battery modules 110 will be called 'first temperature information'. Further, the first communication unit 141 may further receive data indicating the operating state of the battery modules 110. The first temperature information may include at least one of individual temperature, temperature deviation, maximum temperature, minimum temperature and average temperature of each of all the battery modules 110 inside the case 101.

Further, the first communication unit 141 may receive self-diagnosis data being output from the battery modules 110. The self-diagnosis data may include information regarding whether or not each battery module 110 included in the battery assembly has broken down. For example, the BMS 111 may diagnose the state of each battery module 110 that the BMS 111 is combined with, and if a break down occurred in at least one battery module 110, the BMS 111 may output the self-diagnosis data that includes identification information of the battery module 110 where the break down has occurred. Further, the first communication unit 141 may receive schedule data related to operating the battery assembly. The schedule data may include time information of when it is expected that the transmission of the first temperature information from the battery assembly will be stopped. For example, the BMS 111 may proceed updating of various programs used to operate the battery module 110 that the BMS 111 is combined with or to perform an arithmetic operation on the state of the battery module 110, and while the updating is proceeding, generating the first temperature information may be temporarily stopped. Therefore, when the schedule data is provided from the at least one BMS 111 combined with the battery assembly, the first communication unit 141 may analyze the schedule data to identify beforehand the time point when the transmission of the first temperature information will be stopped.

The second communication unit 142 may be wiredly/wirelessly connected with the temperature sensors 121, to receive the temperature information indicating the temperature measured by the temperature sensors 121. Hereinbelow, the temperature information indicating the temperature measured by the temperature sensors 121 will be called 'second temperature information'. In cases where a plurality of temperature sensors 121 are included in the temperature measurement system 120, the second temperature information may include at least one of the individual temperature, temperature deviation, maximum temperature, minimum temperature and average temperature measured by each of the temperature sensors 121.

The third communication unit 143 may be wiredly/wirelessly connected with the HVAC system 130, to receive the air conditioning information indicating the operation mode of each air conditioning apparatus 131 from at least one air conditioning apparatus 131 included in the HVAC system 130. Specifically, in the air conditioning information, data indicating the operation mode per air conditioning apparatus 131 may be included. Further, the third communication unit 143 may receive control signals being output from the control unit 145 that will be explained hereinbelow, and transmit the received control signals to the HVAC system 130. In response to the control signals, the HVAC system 130 may maintain or change at least one of the emission temperature, emission speed, emission flow rate and emission direction set in at least one air conditioning apparatus 131 included therein. That is, operation of each air conditioning apparatus 131 included in the HVAC system 130 may be controlled by the control unit 145.

The memory 144 may store various data and commands required in the overall operations of the temperature control apparatus 140. For example, the memory 144 may include a storage medium of at least one type of a flash memory type, a hard disk type, a solid-state disk (SSD) type, a silicon disk drive (SDD) type, a multimedia card micro type, a random-access memory (RAM); a static random-access memory (SRAM), a read-only memory (ROM), an electrically erasable programmable read-only memory (EEPROM) and a programmable read-only memory (PROM).

In the memory 144, information being processed by other configurative elements included in the temperature control apparatus 140 or data related thereto may be temporarily or permanently stored.

The memory 144 may store data indicating an identification number and an installation position of each temperature sensor 121. For example, in the memory 144, a unique identification number of each temperature sensor 121 may be stored in relation to the position where the corresponding temperature sensor 121 is installed. Here, the identification number may be in the form of numbers and the like, but there is no particular limitation as long as it is in a form that differentiates a certain temperature sensor 121 from other temperature sensors 121.

The control unit 145 is connected with the memory 144, the first communication unit 141, the second communication unit 142 and the third communication unit 143 in an operable manner, to control the overall operations of the temperature control apparatus 140.

The control unit 145 may sequentially or periodically monitor the data transceiving state of the first communication unit 141, the second communication unit 142 and the third communication unit 143. Specifically, the control unit 145 may determine whether or not the first temperature information is being received normally through the first communication unit 141. Further, the control unit 145 may determine whether or not the second temperature information is being received normally through the second communication unit 142. Further, the control unit 145 may determine whether or not the air conditioning information is being received normally through the third communication unit 143.

When the first temperature information is being received normally through the first communication unit 141, the control unit 145 may convert the second communication unit 142 into a sleep mode. If the first temperature information is not being received normally through the first communication unit 141, the control unit 145 may convert the second communication unit 142 into a wake-up mode. From the time point when the second communication unit 142 is converted into the wake-up mode, the control unit 145 may receive the second temperature information through the second communication unit 142. In other words, it is possible for the control unit 145 to activate the second communication unit 142 only during when the first temperature information is not being received normally. Further, the control unit 145 may activate the second communication unit 142 a certain time prior to the time expected for the transmission of the first temperature information to be stopped. For example, if an updating of the software being used in operating the battery assembly is expected at 1 o'clock in the afternoon, the control unit 145 may receive the second temperature information through the second communication unit 142 starting from 12:59 in the afternoon, which is 1 minute before 1o'clock.

Hereinbelow, for convenience of explanation, a state where all the first temperature information and the second temperature information are being received normally will be called a 'first state', a state where the first temperature information is being received normally but the second temperature information is not being received normally will be called a 'second state', and a state where the second temperature information is being received normally but the first temperature information is not being received normally will be called a 'third state'. In the present disclosure, regardless of the first to third states, it will be assumed that the air conditioning information is always being received normally through the third communication unit 143.

When entering the first state or the second state, the control unit 145 may control the operation of the HVAC system 130 based on the first temperature information. In other words, while the first temperature information is being received normally, regardless of whether or not the second temperature information is being received, the control unit 145 may control the operation of each air conditioning apparatus 131 included in the HVAC system 130 based on the first temperature information.

Specifically, since the second temperature information indicates the temperature being measured by the temperature sensor 121 installed on an outer surface of the battery module 110 or in an area between the battery module 110 and the case 101, it is not identical to the first temperature information indicating the temperature being measured by the BMS 111 of the battery module 110. In other words, compared to the second temperature information, the first temperature information indicates the temperature of the battery module 110 itself relatively exactly.

If using only the second temperature information as it is in the third state to control the HVAC system 130, compared to the method of controlling the HVAC system 130 based on the first temperature information, controlling the temperature of the inner space of the energy storage system 100 exactly will inevitably be difficult. Therefore, it is preferable to correct the second temperature information suitably, and this will be explained in detail hereinbelow.

Referring to FIG. 2B, the calories being supplied per unit of time to the inner space of the housing unit 103 may be calculated using the Equation 1 below.

$$Q1 = m \times C \times (T_o - T_i) \qquad \text{<Equation 1>}$$

In the Equation 1, $T_i$ is the temperature of the cooling medium being introduced into the inlet 104a formed in the housing unit 103, $T_o$ is the temperature value of the cooling medium being emitted from the outlet 104b of the housing unit 103, m is the flow rate of the cooling medium being introduced into the housing unit 103, C is the specific heat of the cooling medium being introduced into the housing unit 103, and Q1 is the calories being supplied into the housing unit 103 per unit of time. Here, m and C may be values predetermined through experiments and the like.

$T_i$ may be the temperature measured by the temperature sensor 121a disposed at the inlet 104a side, or the emission temperature of the HVAC system 130. Further, $T_o$ may be the temperature measured by the temperature sensor 121b disposed at the outlet 104b side. That is, in the second temperature information, at least $T_o$ is included, and depending on an embodiment, $T_i$ may be further included.

The calories being emitted per unit of time from the battery module 110 disposed inside the housing unit 103 may be calculated using the Equation 2 below.

$$Q2 = hA(T_e - T_i) \qquad \text{<Equation 2>}$$

The Equation 2 follows Newton's law of cooling, and $T_e$ is the temperature of the battery module 110 disposed inside the housing unit 103, that may be a value included in the first temperature information. Further, h is the convective heat transfer coefficient, A is the surface area of the battery module 110, and Q2 is the calories being emitted per unit of time from the battery module 110 disposed in the housing unit 103. Here, h and A may be values predetermined through experiments.

Further, the unit of the $T_i$, $T_o$ and $T_e$ may be ° C., the unit of m may be kg/sec, the unit of C may be cal/(kg ° C.), the unit of h may be cal/(m$^2$sec ° C.) and the unit of A may be m$^2$.

Meanwhile, most of the space inside the housing unit 103 may be occupied by the battery module 110, in which case the difference between Q1 and Q2 may be small enough to be disregarded. Assuming Q1 and Q2 are the same, the Equation 3 below may be derived from the Equation 1 and Equation 2.

$$T_e = T_i + m \times C \times (T_o - T_i) \times \frac{1}{h \times A} \qquad \text{<Equation 3>}$$

From the Equation 3, when two values of $T_i$, $T_o$ and $T_e$ are known, it is possible to estimate the remaining one value. The control unit 145 of the temperature control apparatus 140 according to an embodiment of the present disclosure may use the Equation 3 while the third state is being maintained. As aforementioned, in the third state, $T_i$ and $T_o$ may be known. Therefore, by substituting $T_i$ and $T_o$ into the Equation 3, it is possible to estimate $T_e$ that represents the temperature of the battery module 100 itself.

That is, by controlling the HVAC system 130 based on $T_e$ that is the estimated temperature value instead of $T_i$ that is the temperature value measured by the temperature sensor 121a disposed at the inlet 104a side or $T_o$ that is the temperature value measured by the temperature sensor 121b disposed at the outlet 104b side, it is possible to control the HVAC system 130 such that the temperature of the inner space of the case 101 is maintained within a suitable range.

The control unit 145 of the temperature control apparatus 140 according to another embodiment may compare the first temperature information with the second temperature information while the first state is being maintained, to learn the correlation between the first temperature information and the second temperature information. Preferably, learning the correlation between the first temperature information and the second temperature information may be differentiated per operation mode of the HVAC system 130, and thus such learning operations will be explained in detail hereinbelow with reference to FIG. 4.

Figure 4:
FIG. 4 is a view exemplarily illustrating various operation modes that an air conditioning apparatus of an HVAC system may have in an energy storage system according to the present disclosure.

FIG. 4 is a view exemplarily illustrating various operation modes that the air conditioning apparatus 131 of the HVAC system 130 provided in the energy storage system according to the present disclosure may have.

Referring to FIG. 4, one can see a classification table 400 that the temperature control apparatus 140 uses to determine the operation mode of the HVAC system 130. The HVAC system 130 may have any one of a plurality of pre-defined operation modes. Here, any one of the operation modes may be differentiable from other operation modes according the range of each of the emission temperature, emission flow rate and emission speed pre-defined in the classification table 400. The classification table 400 illustrated in FIG. 4 may be pre-prepared in the form of a look-up table (LUT) and the like, and then stored in the memory 144.

Each of the emission temperature, emission flow rate and emission speed of the HVAC system 130 may be differentiated into at least high level (H) and low level (L). For example, the temperature of the cooling medium currently being emitted from the HVAC system 130 being higher than a predetermined reference temperature (e.g., 25° C.) becomes the high level (H), and the temperature of the cooling medium currently being emitted from the HVAC system 130 being equal to or lower than the predetermined reference temperature becomes the low level (L). In another example, the flow rate of the cooling medium currently being emitted from the HVAC system 130 being greater than a predetermined reference flow rate (e.g., 0.01 kg/sec) becomes the high level (H), and the flow rate of the cooling medium currently being emitted from the HVAC system 130 being equal to or smaller than the predetermined reference flow rate becomes the low level (L). In another example, the speed of the cooling medium currently being emitted from the HVAC system 130 being faster than a predetermined reference speed (e.g., 1 m/sec) becomes the high level (H), and the speed of the cooling medium currently being emitted from the HVAC system 130 being equal to or slower than the predetermined reference speed becomes the low level (L).

Here, each of the emission temperature, emission flow rate and emission speed of the HVAC system 130 may represent the emission temperature, emission flow rate and emission speed of any one of all the air conditioning apparatuses 131 included in the HVAC system 130. Further, each of the emission temperature, emission flow rate and emission speed of the HVAC system 130 may represent the average emission temperature, average emission flow rate and average emission speed of all the air conditioning apparatuses 131 included in the HVAC system 130.

According to the classification table 400 illustrated in FIG. 4, the first operation mode (Mode #1) represents a case where the emission temperature, emission flow rate and emission speed are all high levels (H). That is, if the emission temperature, emission flow rate and emission speed of the HVAC system 130 included in the air conditioning information received through the third communication unit 143 at a certain time point all correspond to high levels (H), the control unit 145 may determine that the HVAC system 130 is operating in the first operation mode (Mode #1) at that certain time point.

The second operation mode (Mode #2) represents a case where the emission temperature, emission flow rate and emission speed are low level (L), high level (H) and high level (H), respectively. That is, if the emission temperature, emission flow rate and emission speed of the HVAC system 130 included in the air conditioning information received through the third communication unit 143 at a certain time point correspond to low level (L), high level (H) and high level (H), respectively, the control unit 145 may determine that the HVAC system 130 is operating in the second operation mode (Mode #2) at that certain time point. Of course, it is obvious that determinations regarding the third to fifth operation modes (Mode #3 to #5) may be made in the same method, and thus specific explanation thereof will be omitted.

Meanwhile, although the units of the temperature, flow rate and speed of the cooling medium were exemplified as being ° C., kg/sec and m/sec, respectively, it is obvious that they may be expressed in different units as long as they can represent the temperature, flow rate and speed of the cooling medium. For example, when the cooling medium is air, the unit of the flow rate of the cooling medium may be expressed using $m^3$/sec instead of kg/sec.

Further, the reference temperature, reference flow rate and reference speed may be set to various values or can be changed later on according to the number, size, specification and installation environment and the like of the battery module 110 included in the battery assembly.

Meanwhile, although it is illustrated in FIG. 4 that only five types of operation modes can be defined in a mutually differentiable way, this is merely an example, and thus it is obvious to those skilled in the art that they can be changed to have other ranges.

In terms of hardware, the aforementioned control unit 145 may be realized using at least one of application specific integrated circuits (ASICs), digital signal processors (DSPs), digital signal processing devices (DSPDs), programmable logic controller (PLC), field programmable gate arrays (FPGAs), micro-controllers, microprocessors and electrical units for performing other functions.

Meanwhile, it is illustrated in FIG. 3 that any one of the configurative elements is connected with another one of the configurative elements through at least one connecting line. However, this is merely an example, and thus the actual realization between the configurative elements of the temperature control apparatuses 140 should not be understood as being limited by the connecting line illustrated in FIG. 3.

Further, the temperature control apparatus 140 may be configured to have less configurative elements than the configurative elements illustrated in FIG. 3, or to have more additional configurative elements that are not illustrated in FIG. 1.

The temperature control apparatus 140 according to the present disclosure may be realized in a form to be included in the battery assembly combined therewith. That is, the battery assembly according to the present disclosure may include the temperature control apparatus 140.

FIG. 5A through 5D are views to be referenced in order to explain a method where the temperature control apparatus 140 according to an embodiment of the present disclosure learns the correlation between the first temperature information and the second temperature information. As aforementioned, the control unit 145 may learn the correlation between the first temperature and the second temperature being received while the first state is being maintained.

Further, while the temperature control apparatus 140 is in the first state, the control unit 145 may receive the air conditioning information through the third communication unit 143, and monitor the operation mode of the HVAC system 130 and its changes based on the received air conditioning information.

For example, it is possible to assume a situation where, while the temperature control apparatus 140 is in the first state, the operation mode of the HVAC system 130 changes in the order of the first operation mode (Mode #1), the second operation mode (Mode #2) and the third operation mode (Mode #3).

In this case, the control unit 145 may store the data indicating the correlation between the first temperature information and the second temperature information being learned while the first operation mode (Mode #1) is being maintained, in the memory 144 in relation to the first operation mode (Mode #1). Next, after the first operation mode (Mode #1) ends, the data indicating the correlation between the first temperature information and the second temperature information being learned while the second operation mode (Mode #2) is being maintained may be stored in the memory 144 in relation to the second operation mode (Mode #2). Next, after the second operation mode (Mode #2) ends, the data indicating the correlation between the first temperature information and the second temperature information being learned while the third operation mode (Mode #3) is being maintained may be stored in the memory 144 in relation to the third operation mode.

Figure 5A:
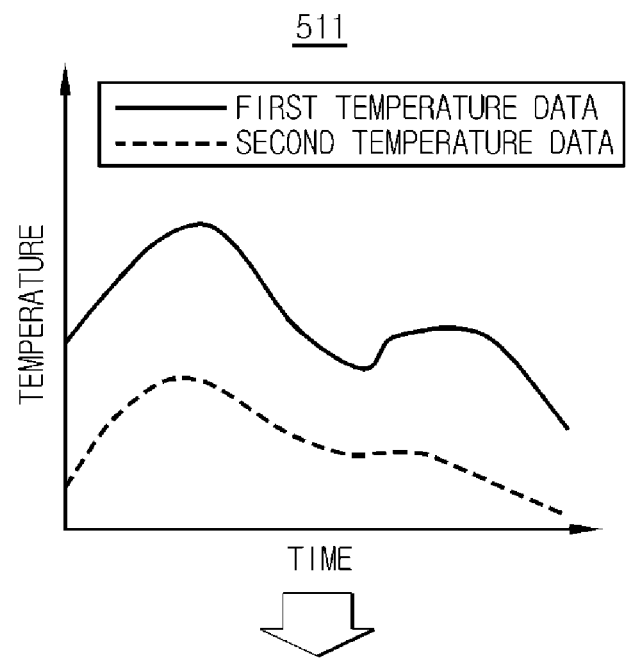
FIGS. 5A through 5D are views to be referenced in order to explain a method where a temperature control apparatus learns a correlation between first temperature information and second temperature information according to an embodiment of the present disclosure.

First, the graph 511 of FIG. 5A represents changes of each of the first temperature information and the second temperature information with respect to time in the case where the HVAC system 130 is operating in the first operation mode. The control unit 145 may perform an arithmetic operation on the difference value between the first temperature information and the second temperature information regarding the same time point in real time or periodically, and record the arithmetically operated difference value in the memory 144 in relation to the first temperature information or the second temperature information. Such learning of correlation may be performed every time the HVAC operates in the first operation mode (Mode #1), and accordingly, the data indicating the correlation between the first temperature information and the second temperature information regarding the first operation mode (Mode #1) may be updated.

Figure 5B:
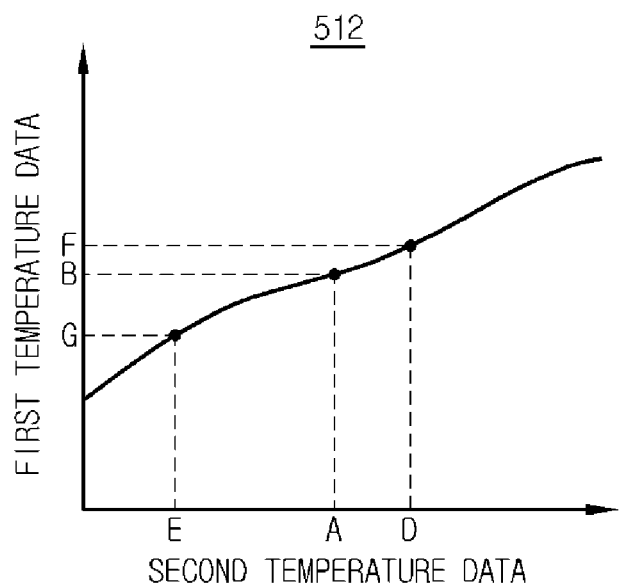

The graph 512 of FIG. 5B represents the correlation learned from the graph 511 of FIG. 5A. As illustrated, there may be a tendency of the second temperature information increasing as the first temperature information increases. The control unit 144 may set the compensation value regarding each of a plurality of predetermined temperature sections, based on the correlation in the first operation mode (Mode #1) such as the graph 512. For example, in the graph 512, when the value of the second temperature data is A, the value of the first temperature data is B, and thus the control unit 144 may set (B-A) as the compensation value regarding A or the temperature section where A belongs.

Figure 5C:
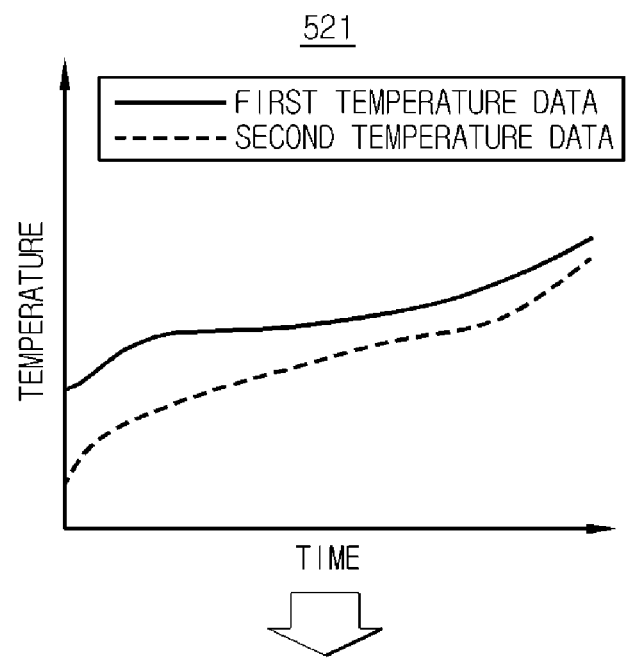

First, the graph 521 of FIG. 5C represents changes of each of the first temperature information and the second temperature information with respect to time, in the case where the HVAC is operating in the second operation mode. The control unit 145 may perform an arithmetic operation on the difference value between the first temperature information and the second temperature information regarding the same time point in real time or periodically, and record the arithmetically operated difference value in the memory 144 in relation to the first temperature information or the second temperature information. Such learning of correlation may be performed every time the HVAC 130 is operated in the second operation mode (Mode #2), and accordingly, the data indicating the correlation between the first temperature information and the second temperature information regarding the second operation mode (Mode #2) may be updated.

Figure 5D:
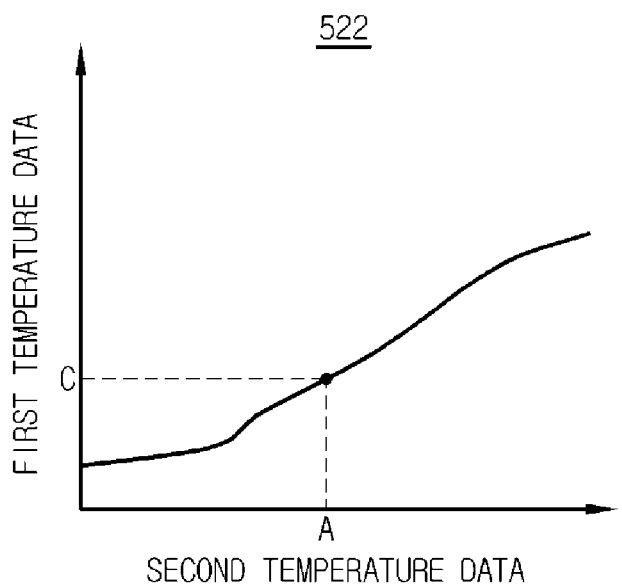

The graph 522 of FIG. 5D represents the correlation learned from the 521 of FIG. 5C. As illustrated, similarly as in graph 511 of FIG. 5A, there may a tendency of the second temperature information increasing as the first temperature information increases. The control unit 144 may set the compensation value regarding each of a plurality of predetermined temperature sections, based on the correlation in the second operation mode (Mode #2), such as the graph 522. For example, in the graph 522, when the value of the second temperature data is A, the value of the first temperature data is C, and thus the control unit 144 may set (C-A) as the compensation value regarding A.

Comparing the two graphs 512, 522, one can see that even when the value of the second temperature information (e.g., A) is the same, the value of the first temperature information (e.g., B) in the first operation mode (Mode #1) and the value of the first temperature information in the second operation mode (Mode #2) are different from each other.

According to the present disclosure, the first temperature information corresponding to a certain value of the second temperature information per operation mode of the HVAC system 130 may vary. For example, a certain value of the first temperature information corresponding to a certain value A of the second temperature information in the first operation mode (Mode #1) may be B, and a certain value of the first temperature information corresponding to a certain value A of the second temperature information in the second operation mode (Mode #2) may be C, that is different from B.

Therefore, compared to the method of estimating the value of the first temperature information by uniformly applying a fixed compensation value to the value of the second temperature information, it is possible to control the temperature of the battery assembly installed inside the case 101 more exactly and quickly.

Figure 6:
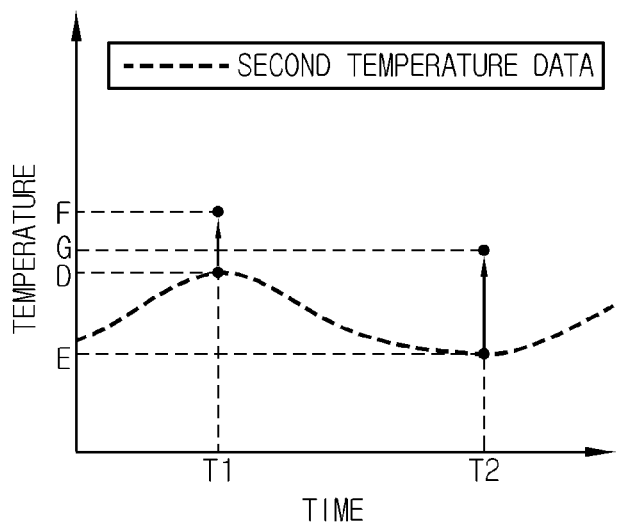
FIG. 6 is a view to be referenced in order to explain a method in which the temperature control apparatus estimates the temperature of a battery assembly using a pre-learned correlation according to an embodiment of the present disclosure.

FIG. 6 is a view to be referenced in order to explain a method in which the temperature control apparatus 140 according to an embodiment of the present disclosure estimates the temperature of the battery assembly using a pre-learned correlation.

After the learning of the correlation between the first temperature information and the second temperature information regarding at least one of the plurality of predetermined operation modes regarding the HVAC system 130 is completed, the temperature control apparatus 140 may enter the third state where the first temperature information is not being received normally through the first communication unit 141.

When the temperature control apparatus 140 enters the third state, the control unit 145 may call out from the memory 144 the data indicating the correlation between the first temperature information and the second temperature information that is previously learned. Here, the control unit 145 may call out all the data indicating the pre-learned correlation. Otherwise, the control unit 145 may selectively call out only the data corresponding to the current operation mode of the HVAC system 130, from the data indicating the pre-learned correlation.

For convenience of explanation, an assumption will be made that the learning of the correlation between the first temperature information and the second temperature information regarding the first operation mode (Mode #1) has already completed.

Referring to FIG. 5B and FIG. 6, when it is determined that the HVAC system 130 is being operated in the first operation mode (Mode #1) in the third state, the control unit 145 may estimate the first temperature information based on the correlation expressed in the graph 512 of FIG. 5B and the second temperature information. The control unit 145 may estimate the temperature of each battery module 110 by applying to the second temperature information the compensation value set for the temperature section where the current second temperature information belongs.

Specifically, as in the graph 610 illustrated in FIG. 6, the value of the second temperature information at a first time point T1 may be D, and the value of the second temperature information at a second time point T2 may be E. In this case, from the graph 512, it is possible to obtain F, that is the value of the first temperature information corresponding to D, that is the value of the second temperature information, and obtain G, that is the value of the first temperature information corresponding to E, that is the value of the second temperature information. That is, F represents the first temperature information estimated at the first time point T1, and G represents the first temperature information estimated at the second time point T2.

Accordingly, it is possible for the control unit 145 to control the HVAC system 130 based on F, that is the first temperature information estimated at the first time point T1, and then control the HVAC system 130 based on G, that is the first temperature information estimated at the second time point T2.

Figure 7:
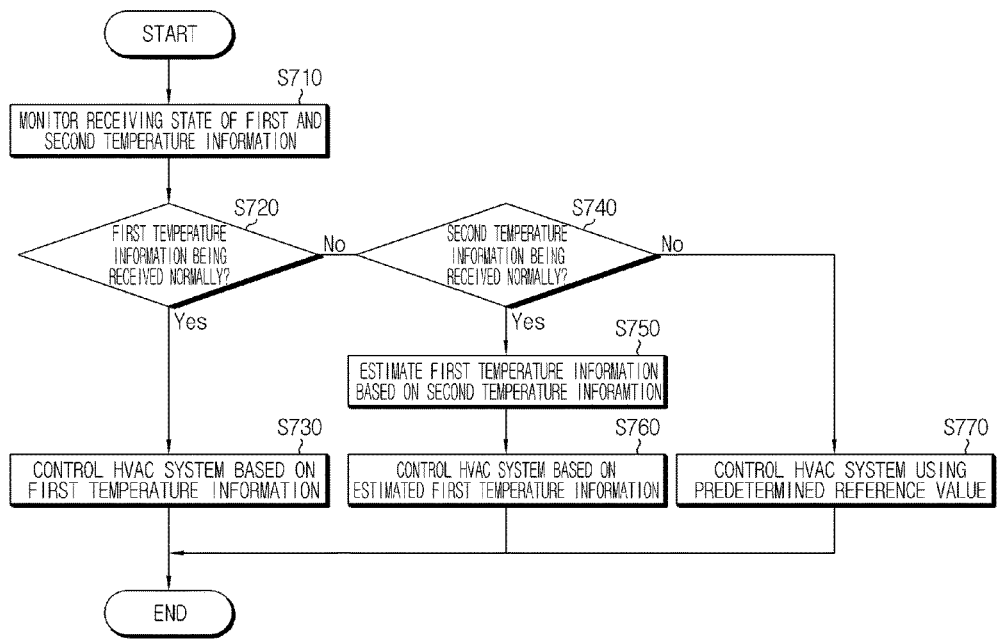
FIG. 7 is a flowchart schematically illustrating a temperature control method being executed by the temperature control apparatus according to an embodiment of the present disclosure.

FIG. 7 is a flowchart schematically illustrating a temperature control method to be executed by the temperature control apparatus 140 according to an embodiment of the present disclosure.

Referring to FIG. 7, at step S710, the temperature control apparatus 140 monitors the receiving state of each of the first temperature information and the second temperature information. Here, the first temperature information may indicate the temperature of the battery module 110 provided inside the case 101, and may be one that is transmitted from the BMS 111 combined with the battery module 110. Further, the second temperature information may indicate the temperature measured by the temperature sensor 121 provided inside the case 101, and may be one that is transmitted from the temperature sensor 121. For example, the second temperature information may be the average value of the temperature measured by all the temperature sensors 121 included in the temperature measurement system 120.

In some cases, at step S710, the temperature control apparatus 140 may further monitor the receiving state of the air conditioning information through the third communication unit 143. Here, the air conditioning information may represent the operation mode of the HVAC system 130. The operation mode of the HVAC system 130 may include data guiding the emission temperature, emission flow rate and emission speed of at least one air conditioning apparatus 131 included in the HVAC system 130.

At step S720, the temperature control apparatus 140 may determine whether or not the first temperature information is being received normally based on the monitoring result of step S710.

If it is determined at step S720 that the first temperature information is being received normally, the temperature control apparatus 140 may perform step S730.

At step S730, the temperature control apparatus 140 controls the HVAC system 130 based on the first temperature information. Depending on an embodiment, the control unit 145 may compare each of the emission temperature, emission flow rate and emission speed of the HVAC system 130 included in the first temperature information with the predetermined reference temperature, reference flow rate and reference speed, and control at least one of the emission temperature, emission flow rate and emission speed of the HVAC system 130 according to the comparison result. For example, in the case where the emission temperature of the HVAC system 130 included in the first temperature information is less than the reference temperature, the control unit 145 may provide a control signal commanding a rise of the emission temperature to the HVAC system 130 through the third communication unit 143. For example, in the case where the emission temperature of the HVAC system 130 included in the first temperature information is higher than the reference temperature by or more than a certain value (e.g., 1.3 times), the control unit 145 may provide the control signal commanding a drop of the emission temperature and a rise of the emission flow rate to the HVAC system 130 through the third communication unit 143.

At step S740, the temperature control apparatus 140 may determine whether or not the second temperature information is being received normally. For example, in the case where the determination result of step S710 is "NO", the temperature control apparatus 140 may perform step S740. In another example, the temperature control apparatus 140 may perform step S740 regardless of the determination result of step S710. In this case, step S720 and step S740 may be performed simultaneously.

If it is determined at step S740 that the second temperature information is being received normally, the temperature control apparatus 140 may perform step S750. On the contrary, if it is determined at step S740 that the second temperature information is not being received normally, the temperature control apparatus 140 may perform step S770.

At step S750, the temperature control apparatus 140 may estimate the first temperature information based on the second temperature information. For example, the control unit 145 may substitute $T_i$ and $T_o$ included in the second temperature information into Equation 3, to estimate $T_e$ that is the value of the first temperature information that is currently not being received normally.

At step S760, the temperature control apparatus 140 may control the HVAC system 130 based on the first temperature information estimated through step S750. For example, in the case where the estimated value of the first temperature information exceeds the reference temperature, the control unit 145 may provide a control signal commanding a drop of the emission temperature to the HVAC system 130 through the third communication unit 143. That is, the temperature control apparatus 140 may control the HVAC system 130 based on the estimated first temperature information instead of controlling the HVAC system 130 directly using the second temperature information. As aforementioned, in the first temperature information, the actual temperature of the battery module 110 is reflected relatively exactly compared to the second temperature information. Therefore, in the case of controlling the HVAC system 130 based on the estimated first temperature information, it is possible to adjust the temperature of the inner space of the case 101 more exactly and efficiently.

At step S770, the temperature control apparatus 140 may control the HVAC system 130 using a predetermined reference value. For example, the control unit 145 may control the HVAC system 130 to supply the cooling medium of the aforementioned reference temperature, reference flow rate and reference speed uniformly until at least one of the first temperature information and the second temperature information is received normally.

Figure 8:
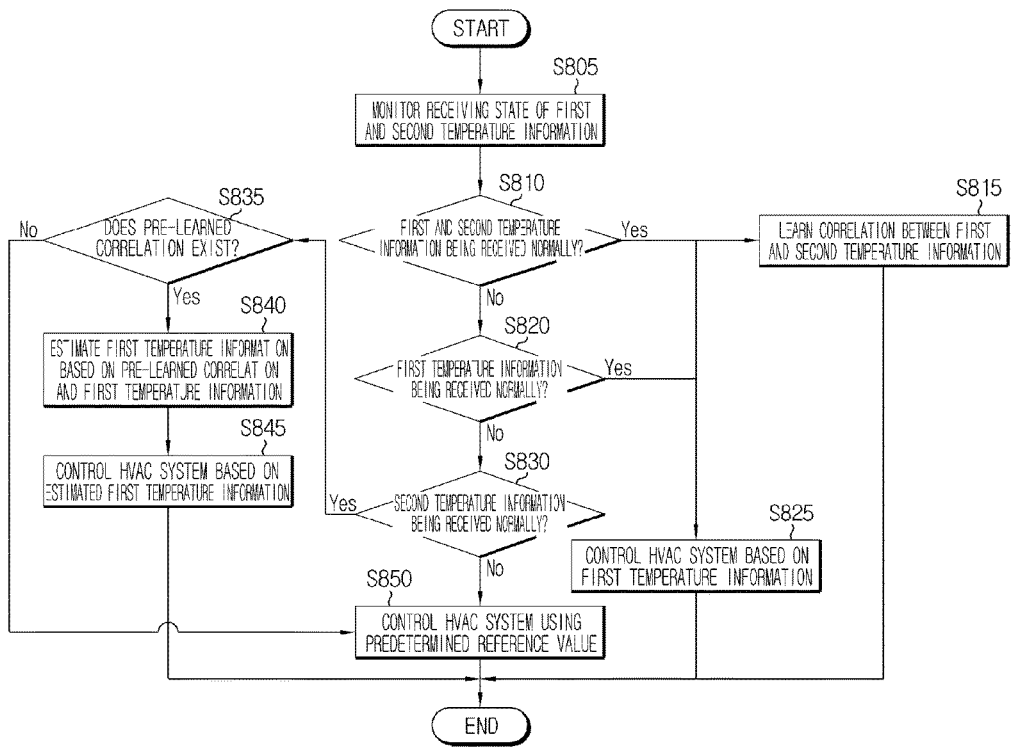
FIG. 8 is a flowchart schematically illustrating a temperature control method being executed by the temperature control apparatus according to another embodiment of the present disclosure.

FIG. 8 is a flowchart schematically illustrating a temperature control method to be executed by the temperature control apparatus 140 according to another embodiment of the present disclosure.

Referring to FIG. 8, at step S805, the temperature control apparatus 140 monitors the receiving state of each of the first temperature information and the second temperature information. Step S805 is the same as step S710 of FIG. 7, and thus specific explanation will be omitted.

At step S810, the temperature control apparatus 140 may determine whether or not the first temperature information and the second temperature information are all being received normally. If it is determined that the first temperature information and the second temperature information are all being received normally, the temperature control apparatus 140 may perform step S815. Further, when at least one of step S805 and step S810 is being performed, the temperature control apparatus 140 may monitor the receiving state of the air conditioning information, and determine whether or not the air conditioning information is being received normally from the HVAC system 130.

At step S815, the temperature control apparatus 140 may learn the correlation between the first temperature information and the second temperature information. Specifically, while the first state where the first temperature information and the second temperature information are all being received normally is maintained, the control unit 145 may mutually compare the first temperature information with the second temperature information, learn the correlation based on the comparison result, and store the learned correlation in the memory 144. If the air conditioning information is being received normally together with the first temperature information and the second temperature information, the temperature control apparatus 140 may store the operation mode of the HVAC system 130 included in the air conditioning information in the memory 144 in relation to the learned correlation. The learned relationship being stored in the memory 144 through step S815 may be utilized later on in estimating the temperature of the battery module 110 when the third state of the first temperature information not being received normally occurs.

If the determination result of step S810 is "NO", the temperature control apparatus 140 may perform at least one of steps S820 and S830.

At step S820, the temperature control apparatus 140 may determine whether or not the first temperature information is being received normally. For example, if a break down currently occurred in the first communication unit 141 or the battery module 110, or the BMS 111 combined with the battery module 110 is updating software and the like, the first temperature information may not be received normally. If the determination result of step S820 is "YES", the temperature control apparatus 140 may perform step S825. On the contrary, if the determination result of step S820 is "NO", the temperature control apparatus 140 may perform step S830.

At step S825, the temperature control apparatus 140 controls the HVAC system based on the first temperature information being received normally.

At step S830, the temperature control apparatus 140 may determine whether or not the second temperature information is being received normally. If the determination result of step S830 is "YES", the temperature control apparatus 140 may perform step S835. On the contrary, if the determination result of step S830 is "NO", the temperature control apparatus 140 may perform step S850.

At step S835, the temperature control apparatus 140 may determine whether or not there exists a pre-learned correlation. Specifically, the control unit 145 may access the memory 144, and check whether or not there is a pre-learned and stored correlation regarding the first temperature information and the second temperature information. If the determination result of step S835 is "YES", the temperature control apparatus 140 may perform step S840. On the contrary, if the determination result of step S835 is "NO", the temperature control apparatus 140 may perform step S850.

At step S840, the temperature control apparatus 140 may estimate the first temperature information that is not being received normally based on the pre-learned correlation and the second temperature information being received normally. If the air conditioning information is received normally at step S805 or S810, only the correlation in relation to the operation mode of the HVAC system 130 corresponding to the air conditioning information may be called out, and based on the called-out correlation and the second temperature information, the first temperature information may be estimated.

At step S845, the temperature control apparatus 140 may control the HVAC system 130 based on the first temperature information estimated through step S840. Step S845 may be identical to S760 of FIG. 7, and thus specific explanation will be omitted.

At step S850, the temperature control apparatus 140 may control the HVAC system 130 using the predetermined reference value. Specifically, step S850 may be performed in the case where none of the first temperature information and the second temperature information is received normally, or in the case where the second temperature information is received normally but there is no pre-learned correlation with the first temperature information. For example, the control unit 145 may control the HVAC system 130 to uniformly supply the cooling medium of the aforementioned reference temperature, reference flow rate and reference speed until at least one of the first temperature information and the second temperature information is received normally.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

The characteristics described in the individual embodiments of the present disclosure may be implemented in combination into one single embodiment. In contrast, a variety of characteristics described herein as a single embodiment may be individually implemented in a variety of embodiments, or implemented in a proper subcombination.

DESCRIPTION OF REFERENCE NUMERALS

100: ENERGY STORAGE SYSTEM
101: CASE
102: BATTERY RACK
110: BATTERY MODULE
120: TEMPERATURE MEASUREMENT SYSTEM
121: TEMPERATURE SENSOR
130: HVAC SYSTEM
131: AIR CONDITIONING APPARATUS
140: TEMPERATURE CONTROL APPARATUS
141: FIRST COMMUNICATION UNIT
142: SECOND COMMUNICATION UNIT
143: THIRD COMMUNICATION UNIT
144: MEMORY
145: CONTROL UNIT

What is claimed is:

1. A temperature control apparatus for an energy storage system comprising a case, a battery module provided inside the case, a temperature sensor provided inside the case and spaced apart from the battery module, and an HVAC system, the temperature control apparatus comprising:
a first communication unit configured to receive first temperature information indicating a temperature of the battery module;
a second communication unit configured to receive, from the temperature sensor, second temperature information indicating a temperature measured by the temperature sensor; and
a control unit connected with the first communication unit and the second communication unit in an operable manner,
wherein the control unit controls the HVAC system based on the first temperature information while the first temperature information is being received normally, estimates the first temperature information based on the second temperature information while the first temperature information is not being received normally and the second temperature information is being received normally, and controls the HVAC system based on the estimated first temperature information.

2. An energy storage system comprising the temperature control apparatus of claim 1.

3. The temperature control apparatus of claim 1, further comprising a third communication unit configured to receive air conditioning information indicating an operation mode of the HVAC system,
wherein the control unit controls the HVAC system further based on the air conditioning information.

4. The temperature control apparatus of claim 3, wherein the battery module is disposed between an inlet and an outlet formed in a rack provided inside the case,
the air conditioning information includes a temperature value of a cooling medium being introduced into the inlet,
the second temperature information includes the temperature value of the cooling medium being emitted from the outlet,
and the control unit estimates the first temperature information based on the temperature value of the cooling medium being introduced into the inlet and the temperature value of the cooling medium being emitted from the outlet while the first temperature information is not being received normally and the second temperature information is being received normally.

5. The temperature control apparatus of claim 4, wherein the control unit estimates the first temperature information using an equation below while the first temperature information is not being received normally and the second temperature information is being received normally, $$T_e = T_i + m \times C \times (T_o - T_i) \times \frac{1}{h \times A} \quad \text{[Equation]}$$

and in the equation, $T_i$ is the temperature value of the cooling medium being introduced into the inlet, $T_o$ is the temperature value of the cooling medium being emitted from the outlet, m is a predetermined flow rate value of the cooling medium, C is a predetermined specific heat of the cooling medium, h is a predetermined convective heat transfer coefficient, A is a predetermined surface area of the battery module, and $T_e$ is the estimated first temperature information.

6. The temperature control apparatus of claim 1, wherein the control unit compares the first temperature information with the second temperature information while the first temperature information and the second temperature information are being received normally, and learns a correlation between the first temperature information and the second temperature information.

7. The temperature control apparatus of claim 6, wherein the control unit estimates the first temperature information based on the correlation and the second temperature information while the first temperature information is not being received normally and the second temperature information is being received normally, after the learning of the correlation is completed, and controls the HVAC system based on the estimated temperature.

8. The temperature control apparatus of claim 7, wherein the control unit sets a compensation value regarding each of a predetermined plurality of temperature sections based on the correlation, and estimates the temperature of each battery module by applying the compensation value set to any one temperature section where the second temperature information belongs, of the plurality of temperature sections, to the second temperature information, while the first temperature information is not being received normally and the second temperature information is being received normally, after the learning of the correlation is completed.

9. The temperature control apparatus of claim 6, wherein the control unit learns the correlation per operation mode of the HVAC system.

10. A temperature control apparatus for an energy storage system comprising a case, a battery module provided inside the case, a temperature sensor provided inside the case and spaced apart from the battery module, and an HVAC system, the temperature control apparatus comprising:
   a first communication unit configured to receive first temperature information indicating a temperature of the battery module;
   a second communication unit configured to receive, from the temperature sensor, second temperature information indicating a temperature measured by the temperature sensor; and
   a control unit connected with the first communication unit and the second communication unit in an operable manner,
   wherein the control unit controls the HVAC system based on the first temperature information while the first temperature information is being received normally, estimates the first temperature information based on the second temperature information while the first temperature information is not being received normally and the second temperature information is being received normally, and controls the HVAC system based on the estimated first temperature information, and
   wherein the battery module is disposed between an inlet and an outlet formed in a rack provided inside the case, the second temperature information includes a temperature value of a cooling medium being introduced into the inlet and the temperature value of the cooling medium being emitted from the outlet,
   and the control unit estimates the first temperature information based on the temperature value of the cooling medium being introduced into the inlet and the temperature value of the cooling medium being emitted from the outlet while the first temperature information is not being received normally and the second temperature information is being received normally.

11. The temperature control apparatus of claim 10, wherein the control unit estimates the first temperature information using an equation below while the first temperature information is not being received normally and the second temperature information is being received normally, $$T_e = T_i + m \times C \times (T_o - T_i) \times \frac{1}{h \times A} \quad \text{[Equation]}$$

and in the equation, $T_i$ is the temperature value of the cooling medium being introduced into the inlet, $T_o$ is the temperature value of the cooling medium being emitted from the outlet, m is a predetermined flow rate value of the cooling medium, C is a predetermined specific heat of the cooling medium, h is a predetermined convective heat transfer coefficient, A is a predetermined surface area of the battery module, and $T_e$ is the estimated first temperature information.

12. A temperature control method comprising:
   monitoring a receiving state of first temperature information indicating a temperature of a battery module provided inside a case;
   monitoring a receiving state of second temperature information indicating a temperature measured by a temperature sensor provided inside the case; and
   controlling a HVAC system provided inside the case based on the first temperature information while the first temperature information is being received normally;
   estimating the first temperature information based on the second temperature information while the first temperature information is not being received normally and the second temperature information is being received normally; and
   controlling the HVAC system based on the estimated first temperature information while the first temperature information is not being received normally and the second temperature information is being received normally.

13. The temperature control method of claim 12, further comprising comparing the first temperature information with the second temperature information while the first temperature information is not being received normally and the second temperature information is being received normally, and learning a correlation between the first temperature information and the second temperature information,
   wherein the estimating the first temperature estimates the first temperature information based on the correlation and the second temperature information.

14. The temperature control method of claim 12, further comprising receiving air conditioning information indicating an operation mode of the HVAC system.

15. The temperature control method of claim 14, wherein the battery module is disposed between an inlet and an outlet formed in a rack provided inside the case, the air conditioning information includes a temperature value of a cooling medium being introduced into the inlet, and the second temperature information includes the temperature value of the cooling medium being emitted from the outlet, and
   the estimating the first temperature information estimates the first temperature information based on the temperature value of the cooling medium being introduced into the inlet and the temperature value of the cooling medium being emitted from the outlet, when the first temperature information is not received normally and the second temperature information is received normally.

* * * * *